(12) United States Patent
Capehart

(10) Patent No.: US 7,895,763 B2
(45) Date of Patent: Mar. 1, 2011

(54) TOOL FOR DECIPHERING THE DEPTHS OR CUTS ON A KEY FROM THE LOCK ITSELF

(76) Inventor: Keith Daniel Capehart, Biloxi, MS (US)

( * ) Notice: Subject to any disclaimer, the term of this patent is extended or adjusted under 35 U.S.C. 154(b) by 208 days.

(21) Appl. No.: 12/407,732

(22) Filed: Mar. 19, 2009

(65) Prior Publication Data

US 2010/0236085 A1 Sep. 23, 2010

(51) Int. Cl.
G01B 1/00 (2006.01)
E05B 19/20 (2006.01)
E05B 19/00 (2006.01)
(52) U.S. Cl. ................ 33/540; 70/394; 70/395
(58) Field of Classification Search .......... 33/539, 33/540; 70/394, 395, 409; 76/110
See application file for complete search history.

(56) References Cited

U.S. PATENT DOCUMENTS

| | | | | |
|---|---|---|---|---|
| 2,338,768 A * | 1/1944 | Johnstone | | 33/540 |
| 3,735,496 A * | 5/1973 | Lee | | 33/540 |
| 4,680,870 A * | 7/1987 | McConnell | | 33/540 |
| 5,325,691 A * | 7/1994 | Embry | | 70/394 |
| 6,134,928 A * | 10/2000 | Kang | | 70/394 |
| 2005/0092048 A1* | 5/2005 | Mathena | | 70/394 |

* cited by examiner

*Primary Examiner* — Amy Cohen Johnson

(57) ABSTRACT

The objective of the invention is to allow the user to decipher the cuts (aka. depths) on a key from the lock without disassembling the lock. The current wafer lock readers on the market rely on a sensitive touch to operate and/or do not give the exact depths to recreate a key. Our wafer lock "reader" will give the exact depth of a cut, coming to a definite stop at the reading position for each cut on the key.

4 Claims, 2 Drawing Sheets

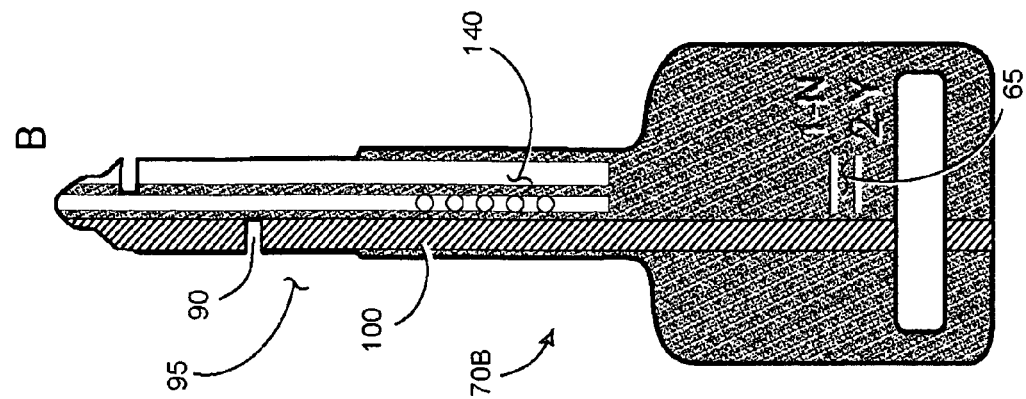
FIG. 4
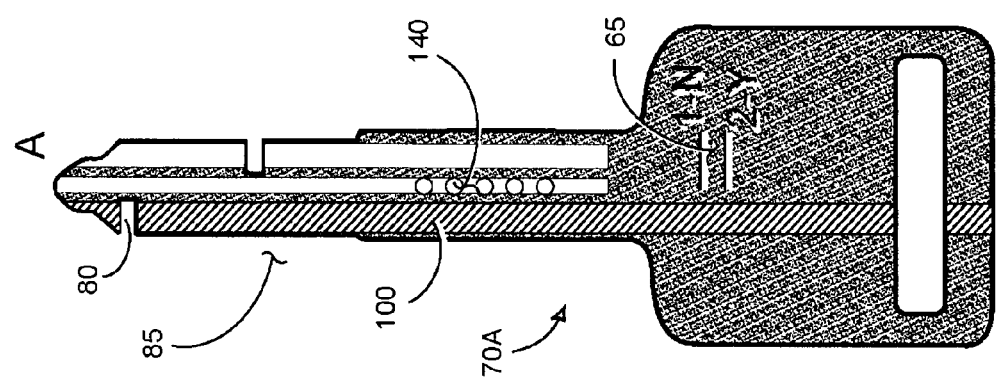
FIG. 3
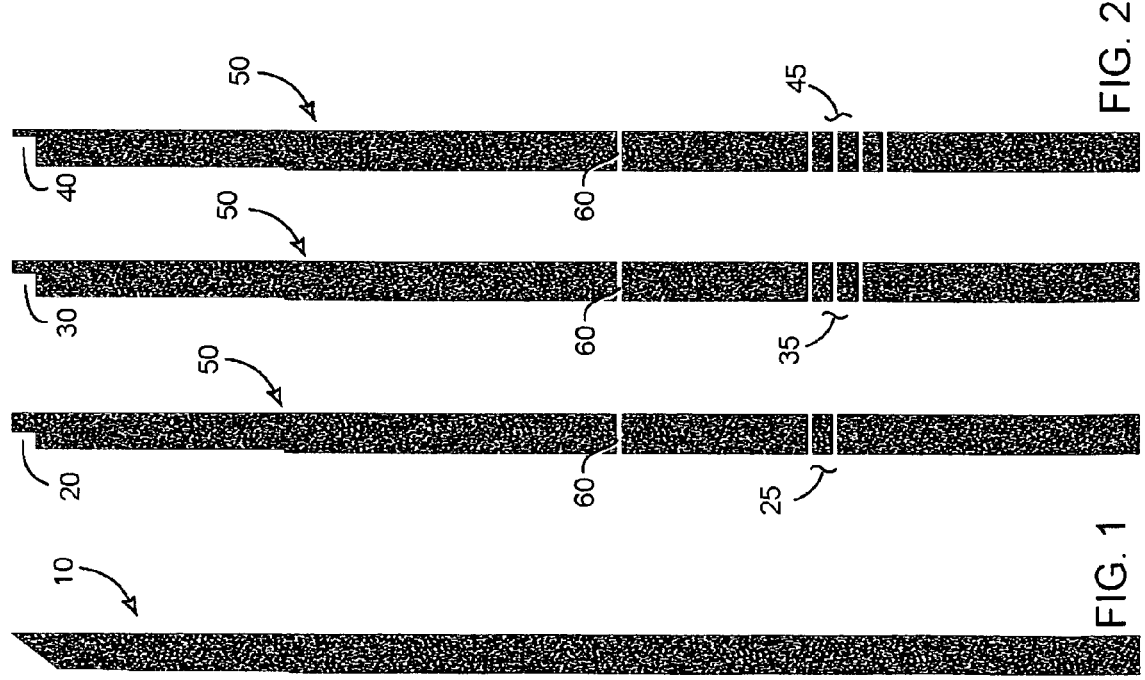
FIG. 2
FIG. 1

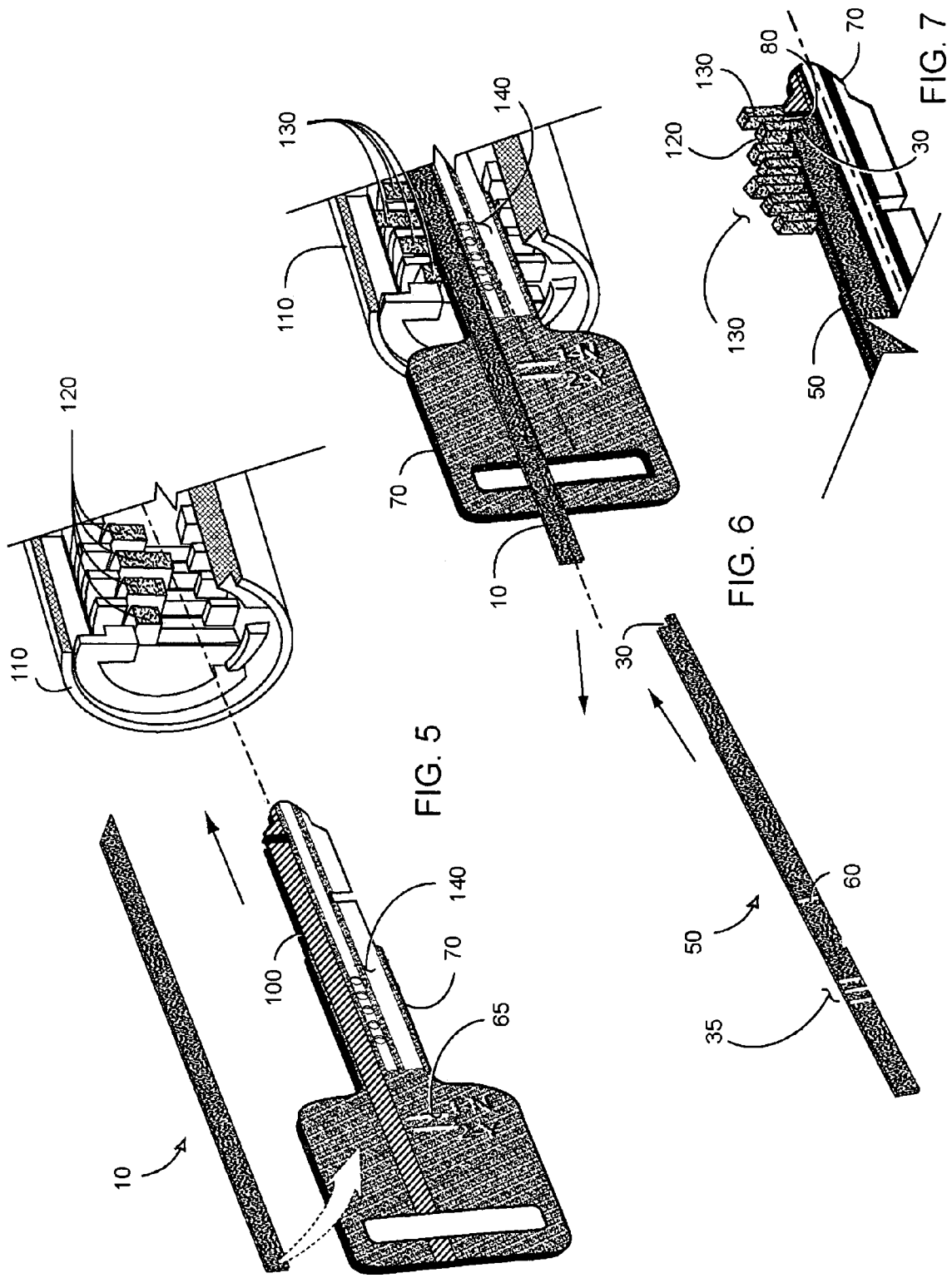

TOOL FOR DECIPHERING THE DEPTHS OR CUTS ON A KEY FROM THE LOCK ITSELF

FIELD OF THE INVENTION

This invention relates to deciphering the depths or cuts on a key from the (wafer) lock itself, and more particularly concerns a system for determining how to make a key to replace a lost key for a specific tumbler or wafer lock.

BACKGROUND OF THE INVENTION

In cylinder locks of conventional design, a cylindrical plug having a key receiving slot or "keyway" bounded by straight upper and lower border surfaces, and having a first series of radially disposed channels communicating with said upper border surface is rotatably secured within a close fitting cylindrical bore in a housing having a second, matching series of channels, known as "pin chambers." The pin chambers are in coaxial alignment with the first series of channels, and open upon said bore. The opposite extremities of the pin chambers, furthest from the bore, are closed. Each pin chamber confines a coil spring in abutment with said closed extremity, a driver pin and a tumbler pin. In some locks the several paired driver pins and tumbler pins are matched to have equal total lengths, and some locks have equal length driver pins with varying length tumbler pins. Both the driver pin and tumbler pin of each chamber are downwardly urged by said spring in a direction transverse to the axis of the plug, whereby the tumbler pins span the gap between the plug and housing.

The lengths of the tumbler pins, and their axial location determine the "code" or key cut depths. When a properly configured key is inserted into the keyway of the plug, the tumbler pins are pushed up to a location flush with the outer surface of the plug, said location called a "shear line." When all the tumbler pins are flush with the surface of the plug, the shear line is "open," and rotation of the plug is permitted. The extent of pushed displacement of the tumbler pins to achieve an open shear line may be referred to as the "travel distance" for a given tumbler pin. The pushing action is achieved by the key acting upon the lowermost extremity of the tumbler pin, which serves as a bearing surface. If a tumbler pin crosses the shear line, the plug will not rotate.

Wafer locks, like tumbler locks, have a cylindrical key receiving plug rotatably secured within a close fitting bore in a housing. The plug holds a series of flat apertured wafers adapted to undergo sliding movement in planes transverse to the axis of elongation of the plug. An outermost edge of each wafer is adapted to enter an aligned locking groove within the bore, and the wafers are spring urged to cause such entrance into the grooves, thereby preventing rotation of the bore in the locked state of the lock.

The aperture of each wafer has an upper edge bearing surface whose distance of separation from said axis varies amongst the several wafers. A key inserted into the plug sequentially penetrates the apertures of the wafers while bearing against said upper edges. Such action causes sliding movement of the wafers against the urging of said spring interactive with each wafer. The sequential sliding movement of the wafers causes the outermost extremities of the wafers to align themselves with the surface of the plug, thereby establishing a shear line which permits rotation of the plug. The axial location of each wafer, and the radial location of the upper edge of the aperture determine the key code for a particular lock.

When a key for a specific lock is lost, it often becomes necessary to analyze the lock to ascertain the requisite code for producing a replacement key. Probe devices for determining the key cuts of locks have earlier been disclosed, as for example in U.S. Pat. Nos. 4,535,546; 4,680,870; 5,224,365; 5,325,691; and 5,172,578. Such earlier devices are based upon mechanical principles of operation, and are often limited to use on certain models of locks, unless significant change is made in the probe device. U.S. Pat. Nos. 5,133,202 and 6,382,007 disclose lock decoding systems involving key-shaped probes having contact points that achieve completion of an electrical circuit at each tumbler, and monitoring means responsive to the resultant electrical current to indicate the travel distance and axial location of each tumbler. Said earlier probe devices are usually difficult to operate, or require time-consuming manipulations, and are often of considerable cost.

SUMMARY OF THE INVENTION

The present invention relates to a tool for deciphering the depths or cuts on a key from the (wafer) lock itself. The invention is comprised of the following components:

1 Reader (modified key)
1 release/insertion tool
3 depth slides. The number of slides can very depending on how many depths a particular a lock was designed to use.

A reader that works by modifying a key blank by cutting a slot down the length on it so that a slide can be inserted into the lock with the modified key blank and measure the height of each wafer. This measurement translates into the cut depth that a key would need to be to operate that particular lock. Typically a lock has four depths of cuts on a key. With a slide tool for each depth you can accurately determine what depth the cut needs to be for that particular space on the key.

When the reader is inserted into the lock with the insertion/release tool. When the insertion/release tool is removed the wafer will get trapped in a slot cut into the key. The depth slides when used in order will determine the depth that a key would need to be cut for that particular wafer position.

Then the insertion/release tool is reinserted to allow the key to move to the next wafer position. The process can be repeated for each wafer position in the lock to allow for a replacement key to be made without removing or disassembling the lock itself.

When the reader is used correctly, it will determine the necessary cuts that a replacement key would need to have to be able to operate the lock.

By using the deepest depth slide first and preceding in order to the shallowest the reader will identify the depth of that wafer in the lock.

The reader is marked with a YES line and a NO line. The depth slides are numerically marked and also have an alignment mark that will line up with either the yes mark or the no mark on the reader. For example, a typical wafer lock will have 8 positions and four different depths. If the depth of position five was a three depth the process for using the reader would be as follows:

(1) Insert the reader with the insertion/removal tool.
(2) Remove insertion/removal tool
(3) Insert the #4 depth slide and the alignment mark would indicate a No.
(4) Insert the #3 depth slide; the alignment mark will now indicate a Yes.
(5) The depth for position five is a three depth.
(6) Proceed to the next position in the lock. The readers will vary slightly for each type of key. This is because not all manufacturers use the same spacing between cuts, the same number of wafers, the same depths, or the same key blank. (For example, a Ford Reader is not going to fit into a GM lock). However the procedure for how the tool works is the same with all wafer locks.

BRIEF DESCRIPTION OF THE DRAWING

FIG. 1 is a plan view of a release and insertion tool;
FIG. 2 is a plan view of three depth slot tools:
FIG. 3 is a front side view of a modified key blank;
FIG. 4 is a back side view of the modified key blank;
FIG. 5 is a perspective view of a lock with wafers in a rest position (four shown) as a modified key blank is to be inserted;
FIG. 6 is a perspective view of a lock with wafers in a raised position by virtue of the inserted modified key blank with the release and insertion tool in place, further illustrating a depth gauge about to be inserted following removal of the release and insertion tool.
FIG. 7 is a perspective view of a last depth slot tool inappropriate for that wafer (and reading no) just sliding under a wafer in a rest position illustrated here as the sixth wafer while all other wafers are in raised position. It is seen here that the next higher depth gauge with a larger step at the end would not insert as far as the incorrect depth gauges previously tested, by approximately the step length and thereby aligning the depth label or identifier with the 1-Y or 'yes' label on the modified key blank.

DETAILED DESCRIPTION OF THE INVENTION

Number Description List 10 is a release and insertion tool.
20 is a 2-depth gauge.
25 is a 2-depth label or identifier.
30 is a 3-depth gauge.
35 is a 3-depth label or identifier.
40 is a 4-depth gauge.
45 is a 4-depth label or identifier.
50 is a depth slot tool.
60 is a depth slot tool measurement line.
65 is a key measurement line pair, one for "NO" and one for "YES" for indicating the incorrect or the correct depth gauge depending upon the depth that the depth gauge is able to be inserted into a lock and whether or not it strikes or slides under a lock wafer in it's rest position.
70 is a modified key blank.
70A is a front side of a modified key blank.
70B is a back side of the modified key blank.
80 is a wafer slot for positioning at the inner wafers of a lock.
85 is the active key side for the inner wafers of the lock.
90 is a wafer slot for positioning at the outer wafers of the lock.
95 is the active key side for the outer wafers of the lock.
100 is a slot or depression milled into the modified key blank for accepting the release and insertion tool 10 and depth tools 50.
110 is a lock.
120 is a wafer in a rest position.
130 is a wafer in a raised position.
140 are holes added to the modified key blank. The holes are placed there to assist in the use in gauging the spacing from one wafer position to the next wafer position while the user is moving the key from one wafer position to the next wafer to be read.
For this tool demonstration it's assumed that the wafer lock being measured has seven wafer positions and four possible depths.

To use the tool, the user would first place the insertion/release tool (10) into the slot (100) on the modified key (70A), this will allow the modified key to enter the keyway completely without trapping the wafers in the wafer trap (80). With the modified key (70A) fully seated in the lock the wafer trap (80) will be aligned with the seventh wafer in the lock.

Once the modified key (70A) has been placed fully within the keyway, the insertion/release tool (10) is removed allowing the wafer (120) in position seven to drop into the wafer trap (80) to its resting position.

The #4 depth slide (45) is then fully inserted into the slot (100) of the modified key (70A). This motion will cause the measurement line (60) to align with either the YES or the NO (65) on the modified keyblank (70A).

If, the measurement line (60) aligns with the YES (65), the depth for the wafer in position seven is a four depth. The #4 depth slide (45) would then be removed and the insertion/release tool (10) would be inserted to lift the wafer out of the wafer trap (80) and allow the modified key (70A) to be moved outward using the holes (140) in the key as a guide to measure the distance to the next wafer position to be measured. Once in position the insertion/release tool (10) is removed trapping the next wafer to be measured.

If, the measurement line (60) aligns with the NO (65), the #4 depth slide (45) is removed and the #3 depth slide (35) would be inserted in the slot (100) of the modified key (70A). If the measurement line (60) aligned with a YES (65) the depth for the wafer is position seven would be a three depth. The #3 depth slide (45) would then be removed and the insertion/release tool (10) would be inserted to lift the wafer out of the wafer trap (80) and allow the modified key (70A) to be moved outward using the holes (140) in the key as a guide to measure the distance to the next wafer position to be measured. Once in position the insertion/release tool (10) is removed trapping the next wafer to be measured.

If, the measurement line (60) aligns with the NO (65), the #4 depth slide (45) is removed and the #3 depth slide (35) would be inserted in the slot (100) of the modified key (70A). If the measurement line (60) aligned with a NO (65) again the #3 depth slide (35) would be removed and the #2 depth slide would be inserted in the slot (100) of the modified key (70A). If the measurement line (60) of the #2 depth slide aligned with a YES (65) the depth for the wafer is position seven would be a two depth. The #2 depth slide (45) would then be removed and the insertion/release tool (10) would be inserted to lift the wafer out of the wafer trap (80) and allow the modified key (70A) to be moved outward using the holes (140) in the key as a guide to measure the distance to the next wafer position to be measured. Once in position the insertion/release tool (10) is removed trapping the next wafer to be measured. If, the measurement line (60) aligns with the NO (65), the #4 depth slide (45) is removed and the #3 depth slide (35) would be inserted in the slot (100) of the modified key (70A). If the measurement line (60) aligned with a NO (65) again the #3 depth slide (35) would be removed and the #2 depth slide would be inserted in the slot (100) of the modified key (70A). If the measurement line (60) of the #2 depth slide aligned with a NO (65) again, then the depth for wafer position seven is a one depth. The #2 depth slide (45) would then be removed and the insertion/release tool (10) would be inserted to lift the wafer out of the wafer trap (80) and allow the modified key (70A) to be moved outward using the holes (140) in the key as a guide to measure the distance to the next wafer position to be measured. Once in position the insertion/release tool (10) is removed trapping the next wafer to be measured.

The procedure described above would be repeated for wafer positions seven through four.

For wafer positions three through one of the lock they are measured using the modified key (70B). The wafer trap (90) is designed to align with wafer position three when the modified key (70B) is fully inserted. The procedure for determining the depths for positions three through one is the same as described above with the exception of using side B of the modified key (70B) instead of Side A of the modified key (70A).

Once the depths for each of the seven wafer positions has been recorded, a keyblank can be cut to the recorded depths to operate the lock.

NOTE: All the wafer positions can be read from side A of the modified key (70A), however using side B of the modified key (70B) will increase the accuracy of the tool by allowing the modified key to be inserted further into the lock when using the depth gauges on the wafers closer to the face of the lock.

What is claimed is:

1. A tool for deciphering depths or cuts on a key from a lock comprising:
   a reader or modified key;
   a release/insertion tool for allowing the reader or modified key to enter a keyway of a lock completely;
   and a set of a plurality of depth gauge slides, wherein each depth gauge slide comprises identifying indicia, a depth slot line, and a depth gauge;
   wherein a front surface of the reader or modified key comprises markings to indicate a position within a lock and a pair of indicator markings to indicate if, when each of the depth gauge slides is selectively inserted into the reader or modified key, the depth gauge slide is the correct or incorrect depth gauge for each position within a lock.

2. The tool of claim 1 wherein the depth gauge of each of the depth gauge slides comprises a precisely measured step on a tip of each of the depth gauge slides.

3. The tool of claim 1 wherein a back surface of the reader or modified key comprises markings to indicate a position within a lock and a pair of indicator markings to indicate if, when each of the depth gauge slides is selectively inserted into the reader or modified key, the depth gauge slide is the correct or incorrect depth gauge for each position within a lock, creating a reversible tool.

4. The tool of claim 1 wherein the markings to indicate a position within a lock comprise alignment holes.

* * * * *